(12) United States Patent
Petrovykh et al.

(10) Patent No.: US 10,750,019 B1
(45) Date of Patent: Aug. 18, 2020

(54) SYSTEM AND METHOD FOR ASSISTING AGENTS VIA ARTIFICIAL INTELLIGENCE

(71) Applicant: Genesys Telecommunications Laboratories, Inc., Daly City, CA (US)

(72) Inventors: Yevgeniy Petrovykh, Walnut Creek, CA (US); Alex Khodorenko, Walnut Creek, CA (US); Vadim Fridman, Pacheco, CA (US); Aleksey Kovalenko, Burlingame, CA (US); Andrey Lunin, Saint Petersburg (RU)

( * ) Notice: Subject to any disclaimer, the term of this patent is extended or adjusted under 35 U.S.C. 154(b) by 0 days.

(21) Appl. No.: 16/369,298

(22) Filed: Mar. 29, 2019

(51) Int. Cl.
*H04M 3/51* (2006.01)
*G06F 3/0481* (2013.01)
*G10L 15/22* (2006.01)
*G10L 15/30* (2013.01)
*G10L 15/18* (2013.01)
*G06F 40/30* (2020.01)
*G06F 40/279* (2020.01)
*G10L 15/08* (2006.01)

(52) U.S. Cl.
CPC ...... *H04M 3/5183* (2013.01); *G06F 3/04817* (2013.01); *G06F 40/279* (2020.01); *G06F 40/30* (2020.01); *G10L 15/1815* (2013.01); *G10L 15/22* (2013.01); *G10L 15/30* (2013.01); *H04M 3/5133* (2013.01); *G10L 2015/088* (2013.01)

(58) Field of Classification Search
CPC combination set(s) only.
See application file for complete search history.

(56) References Cited

U.S. PATENT DOCUMENTS

| | | | |
|---|---|---|---|
| 2017/0032027 A1* | 2/2017 | Mauro | H04M 3/5133 |
| 2017/0235740 A1* | 8/2017 | Seth | G06F 16/353 |
| | | | 707/738 |
| 2019/0057698 A1* | 2/2019 | Raanani | G10L 15/02 |
| 2020/0013117 A1* | 1/2020 | Mathwig | G06K 9/00302 |

* cited by examiner

*Primary Examiner* — Phung-Hoang J Nguyen

(57) ABSTRACT

A system and method for handling interactions of a contact center. A processor of the system monitors a real-time interaction between a contact center agent and a user. The monitoring may include analyzing a first input by the user, and a first response by the contact center agent to the first input. The processor identifies an intent of the user based on monitoring the real-time interaction, and in response to identifying the intent, monitors for a first trigger condition. In response to identifying the first trigger condition, the processor invokes an automated agent for outputting a second response to a second input provided by the user. The first trigger condition may be a command to invoke the automated agent, or deviance by the agent from dialog in a dialog script associated with the identified intent.

16 Claims, 10 Drawing Sheets

SYSTEM AND METHOD FOR ASSISTING AGENTS VIA ARTIFICIAL INTELLIGENCE

BACKGROUND

In order to remain competitive in the modem commerce system, many businesses remain constantly vigilant of evolving consumer demands, and strive to provide customers with the high quality products and services that they desire. To that end, many businesses employ contact centers that include automated response systems and representatives of the business to process transactions and/or service the needs of their customers.

As will be appreciated by a person of skill in the art, one of the benefits of utilizing automated response systems, such as interactive voice response (IVR) systems, chat bots, or the like, is that they help contact centers minimize the use valuable and costly resources like human agents. Automated response systems may also be faster and more equipped than human agents in searching and retrieving information to be provided to the customers. However, it might not always be desirable to invoke an automated response system. For example, although automated response systems might adequately handle simple requests, they may be inadequate in handling complex requests. Also, some customers might not want to interact with automated response systems as it might be harder to successfully engage in a free, unstructured conversation with automated systems. Thus, it might be desirable to dedicate human agents to handle the requests of those customers even though the requests might easily be handled by an automated response system.

Accordingly, what is desired is a system and method that invokes an automated response system to take over a conversation with an end user in certain situations, or at a minimum, monitors the conversation between the end user and an agent to aid the agent in providing appropriate responses to the customer.

SUMMARY

Embodiments of the present invention are directed to a system and method for handling interactions, such as, for example, interactions of a contact center. A processor of the system monitors a real-time interaction between a contact center agent and a user. The monitoring may include analyzing a first input by the user, and a first response by the contact center agent to the first input. The processor identifies an intent of the user based on monitoring the real-time interaction, and in response to identifying the intent, monitors for a first trigger condition. In response to identifying the first trigger condition, the processor invokes an automated agent for outputting a second response to a second input provided by the user.

In one embodiment, the real-time interaction is at least one of a text-based chat interaction or voice interaction.

In one embodiment, the first trigger condition is receipt of a command by the contact center agent to invoke the automated agent to engage in an automated conversation with the user instead of the agent, and the second response is provided to the user by the automated agent. The processor may dynamically display on a device of the contact center agent, a user-selectable icon for invoking automated agent.

In one embodiment, the processor monitors for a second trigger condition. In response to identifying the second trigger condition, the processor disables the automated agent from engaging in the automated conversation with the user for enabling a third response by the contact center agent instead of the automated agent. The processor may then resume monitoring for the first trigger condition.

In one embodiment, the processor identifies a dialog script, where the first trigger condition is identification of deviance by the contact center agent from dialog in the dialog script, and the automated agent is configured to provide the second response to the contact center agent as a suggested response.

In one embodiment, the processor determines a level of confidence for the determined intent, where the first trigger is identification that the level of confidence is above a preset level.

In one embodiment, the processor identifies key words provided by the user during the real-time interaction, and provides visual feedback for the identified key words.

In one embodiment, the identifying of the intent includes identifying key words in the first input and in the first response, identifying a source of each of the key words as being one of the user or the contact center agent, and performing intent classification based on the identified key words and the identified sources.

In one embodiment, the intent classification includes assigning a probability value to an identified intent, where the probability value depends on a combination of the identified key words and the identified sources.

As a person of skill in the art should appreciate, the system and method of the various embodiments of the invention provide improvements to interaction processing. The assistance might be by taking over the conversation with a customer, or providing suggestions to the agent of recommended responses. The agent may have discretion in allowing the automated agent to take over, depending on the agent's evaluation of the customer, the interaction, and the like. Such discretion may result in higher customer satisfaction than automatically starting the conversation with the automated response system. If the automated agent is not allowed to take over the conversation, it may still provide assistance to the agent by suggesting responses that the agent may use during the conversation. By providing such suggestions, a more efficient conversation with the customer may ensue. This allows valuable resources of the contact center to be used more efficiently and expeditiously. For example, the length of use of telephony lines, call controllers, and/or chat servers on a per conversation basis, may decrease.

DETAILED DESCRIPTION

Figure 1:
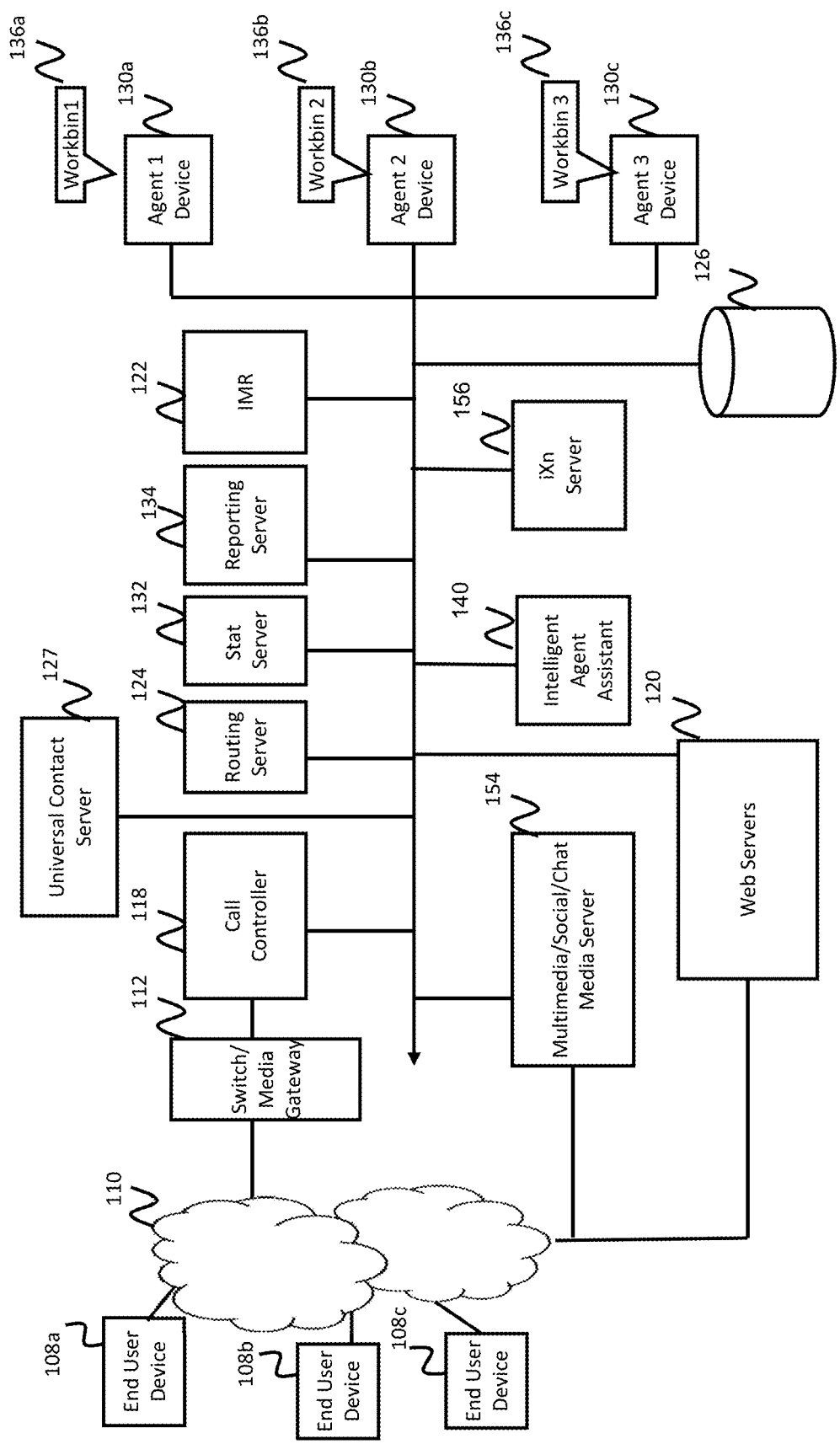
FIG. 1 is a schematic block diagram of a system for assisting human agents of a contact center via an intelligent agent assistant in one embodiment of the invention.

In general terms, embodiments of the invention relate to providing aid to contact center agents via artificial intelligence. According to one embodiment, an intelligent agent assistant monitors a conversation between a human agent and a user/customer, and deduces a topic, category, or intent of the communication (collectively referred to as a customer/user intent). Once the intent is deduced with a certain level of confidence, the intelligent agent assistant may display a prompt to the contact center agent offering to take over the conversation with the user. In some embodiments, the intelligent agent assistant automatically takes over the conversation on behalf of the agent, without any prompts.

Whether automatic or not, once the intelligent agent assistant takes over, it takes over the role of the human agent in the conversation with the user. In this regard, the assistant automatically recognizes input from the user to play/output an appropriate response/dialogue to the recognized input. The agent may stop the automated output of responses by the intelligent agent assistant at any point. For example, the agent may notice a lack of progress in the conversation, frustration by the customer, and/or the like, and take over the conversation instead of the intelligent agent assistant.

If the agent declines the offer by the intelligent agent assistant to take over the conversation, the assistant may nonetheless run in the background to monitor the conversation between the user and the human agent. In this regard, the intelligent agent assistant may output responses that are appropriate to inputs provided by the user. However, instead of providing the responses to the user in a direct conversation with the user, the responses are provided to the human agent as suggested responses. In some embodiments, the suggestions may be provided for all inputs recognized by the intelligent agent assistant. In some embodiments, the intelligent agent assistant may hold back in recommending suggested responses until the human agent starts deviating from an expected dialog flow.

Multiple instances of the intelligent agent assistant may engage in parallel conversations with multiple users at the same time. A human agent may monitor the multiple conversations and intervene when needed. Unlike many existing systems where an automated response system such as an IVR or chat bot may start a conversation with the agent to later be transferred to an agent, a conversation according to the various embodiments of the invention start with the agent, and the agent then has discretion in deciding whether the conversation should be handed over to the intelligent agent assistant. Even if the agent decides that it is not appropriate to hand over the conversation to the intelligent agent assistant, the assistant continues to provide suggested responses to the agent, allowing a more expeditious handling or interactions that allows the minimizing of unnecessary tying up of contact center resources such as phone lines, call controllers, chat servers, and the like.

Although the various embodiments are described in the context of text-based chat conversations, a person of skill in the art should recognize that the embodiments are not limited to chat, but may extend to other types of communications including voice conversations. Thus, any reference to conversation or dialog herein refers to both voice and non-voice conversations or dialogs.

FIG. 1 is a schematic block diagram of a system for assisting human agents of a contact center using artificial intelligence in one embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, 5G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other contact center components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router/processor conventional in the art with specialized hardware and/or software for receiving, processing, and forwarding multi-media events. For example, the multimedia/social media server 154 may include a chat server for processing text-based chat conversations, email server or processing emails, SMS server for processing text-messages, and the like.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn)

server 156 interacts with the routing server 124 for selecting an appropriate agent to handle the activity. Once assigned to an agent, an activity may be pushed to the agent, or may appear in the agent's workbin 136*a*-136*c* (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one embodiment, the system of FIG. 1 further includes an intelligent agent assistant 140 which employs artificial intelligence in providing assistance to contact center agents in handling interactions with customers. In this regard, the intelligent agent assistant includes the appropriate hardware/software to monitor the interactions between the end user devices 108 and the agent devices 136. The intelligent agent assistant 140 may further include the appropriate hardware/software to replace a human agent engaged in one of the monitored interactions, and take over the conversation in place of the human agent. I some situations, instead of the agent assistant 140 taking over the conversation, the agent assistant provides recommendations of suggested responses on the device 136 of the human agent. The human agent may then use the suggested responses in his conversation with the user.

The intelligent agent assistant 140 and the various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of the intelligent agent assistant 140 and each of the servers is described as being provided by the particular server, a person of skill in the art should recognize that their functionality may be combined or integrated into a single server, or the functionality of a particular server may be distributed across one or more other servers without departing from the scope of the embodiments of the present invention. For example, the functionalities of the intelligent agent assistant 140 may be provided by the multimedia/social server 154, IMR 122, interaction server 156, and/or the like.

In the various embodiments, the terms "interaction," "communication," and "conversation" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Figure 2:
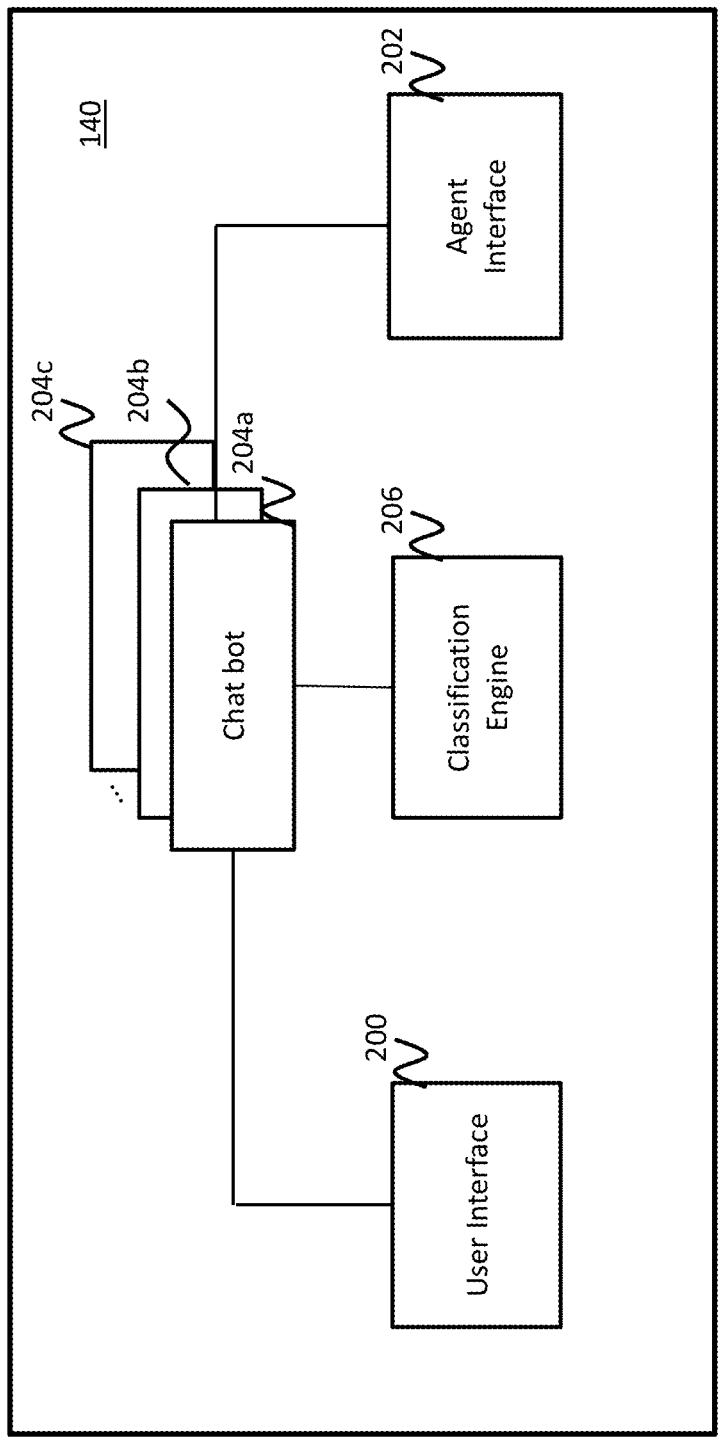
FIG. 2 is a more detailed block diagram of the intelligent agent assistant of FIG. 1, in one embodiment of the invention.

FIG. 2 is a more detailed block diagram of the intelligent agent assistant 140 in one embodiment of the invention. In the exemplary embodiment of FIG. 2, the agent assistant 140 includes an end user interface 200, agent interface 202, one or more automated agent modules 204, and a classification engine 206. The end user interface 200 may facilitate or coordinate communication between users operating the end user devices 108, and the intelligent agent assistant 140. In this regard, the intelligent agent assistant may be implemented in a layered architecture, with a media layer and a media control layer for engaging in a direct communication with the end user devices 108. In some embodiments, the communication may be an indirect communication bridged or moderated by a server of the contact center system (e.g. multimedia/social media server 154).

The agent interface 202 may be similar to the end user interface 200 except that instead of exchanging messages with end users operating the end user devices 108, the messages are exchanged with agents operating the agent devices 130.

The automated agent modules 204*a*-204*c* (collectively referenced as 204), which also form part of the intelligent agent assistant, may be configured with computer program instructions to provide responses to the inputs provided by the end users during an automated chat conversation with the users via the end user interface 200. In some embodiments, the automated agent modules may be configured to provide responses to the inputs provided by the human agents to provide assistance to the agents in their interactions with the users.

The automated agent modules 204 are herein referred to as chat bots, although they may also be referred to as chat robots, chatterbots, dialog systems, conversational agents, automated chat resources, or the like. Also, although the automated agent modules are described as being part of the intelligent agent assistant 140, a person of skill in the art should recognize that the automated agent modules may be hosted in servers other than the intelligent agent assistant 140.

The chat bots 204 may operate, for example, as an executable program that can be launched on demand by the intelligent agent assistant 140. According to some embodiments, a chat server (which may be part of the multimedia-social media server 154) may operate as an execution engine or environment for the chat bots 204. In this regard, dialogue scripts corresponding to a particular deduced intent may be loaded to the chat server for engaging in an automated chat conversation with the users. In other embodiments, the IMR 122 may operate as the execution engine or environment, and may be analogous to loading VoiceXML files to a media server for interactive voice response (IVR) functionality. Regardless of the execution engine, the intelligent agent assistant 140 may control the loading and unloading of the chat bots 204 along with the appropriate dialog scripts.

In some embodiments, the chat bots 204 may vary according to the design and function of the agent assistant server 140, and is not limited to the number illustrated in FIG. 2. Different chat bots may be created to handle different types of intents. For example, one chat bot may be designed or specialized with one dialogue script to engage in a first intent/topic of communication (e.g., opening a new account with the business), while another chat bot may be designed or specialized with another dialogue script to engage in a second topic of communication (e.g., technical support for a product or service provided by the business), that is different from the first topic of communication. In some embodiments, a single default chat bot may be invoked, with a different dialog script being loaded depending on the deduced intent.

In some embodiments, the chat bot and/or dialog script that is selected is based on the topic of the interaction as determined by the classification engine 206. In this regard, the classification engine 206 includes a natural language processing module configured to analyze free speech text from both the agent and customer during a real-time interaction, and determine the intent of the customer based on the analysis. Of course, if the interaction is voice, the classification engine may include a speech-to-text module to transcribe voice utterances into text prior to conducting the analysis.

The natural language processing module may be configured, for example, with a lexicon of a particular language, a syntactic/semantic parser, and grammar rules for breaking a phrase provided by the end user device 108, into an internal syntactic and semantic representation. The configuration of the natural language processing module may depend, in some instances, on the particular profile associated with a particular chat bot 204. For example, certain terms may be included in the lexicon for one chat bot, but excluded from another chat bot.

In some embodiments, the classification engine 206 employs a statistical model to deduce a customer's intent. The statistical model may be created and trained on different combination of keywords, and assigned to different categories/intents. The classification engine 206 uses the model to classify an incoming combination of key words from inputs provided by both the agent and the customer, into one of the likely known intents. For example, certain keywords such as "pay," "payment," and "bill" may be associated with the user intent of "bill pay." Thus, if a user utters the combination of these words, the classification engine 206 may deduce that the user intent is "bill pay." If the intent is deduced within a certain level of confidence, the intent is output as the deduced intent. The intelligent agent assistant 140 may then select the chat bot 204 that is appropriate for the output intent in engaging in an automated conversation with the user, or providing recommended responses to the agent.

Figure 3:
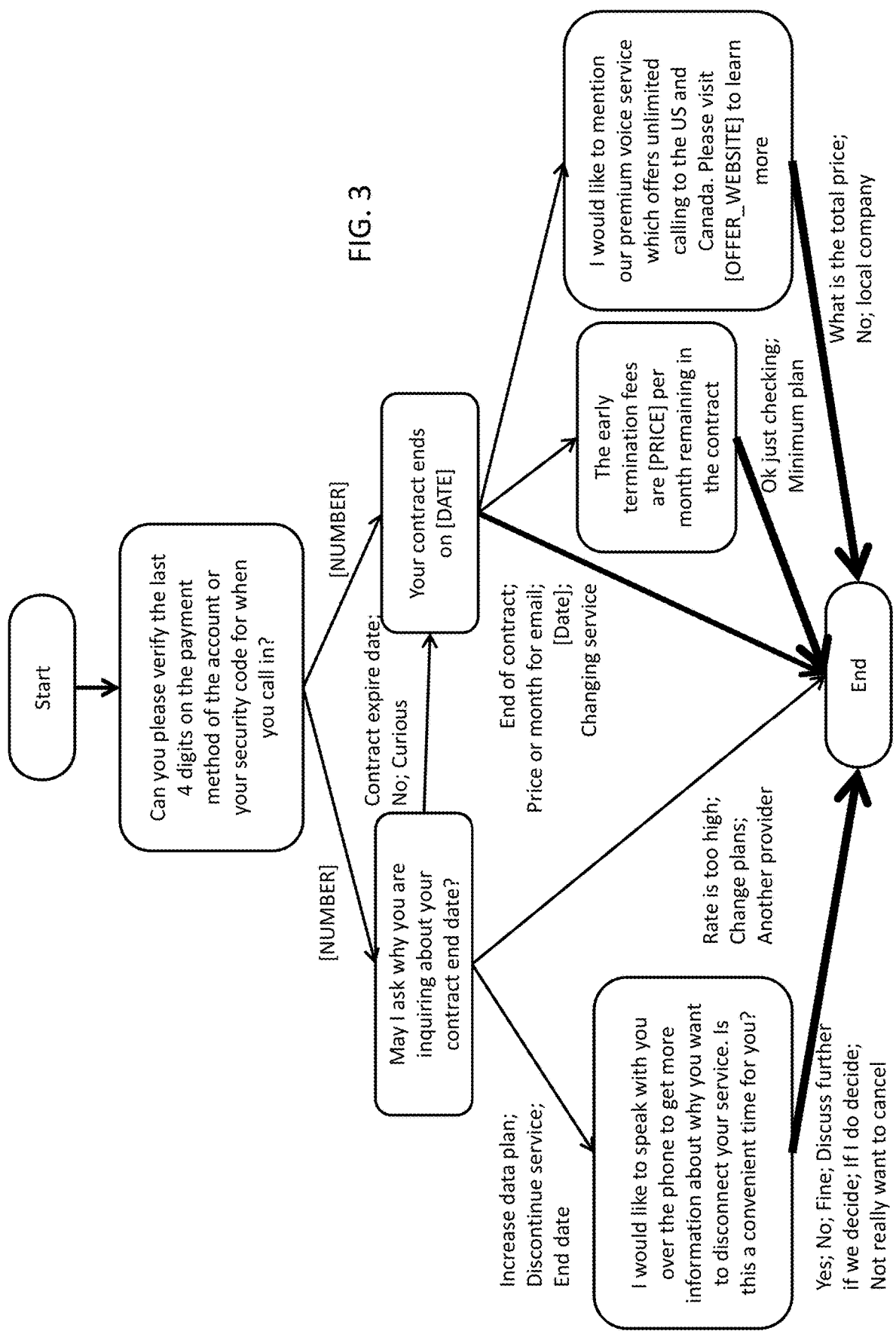
FIG. 3 is a conceptual layout of an example dialogue script that may be employed by a chat bot in one embodiment of the invention.

FIG. 3 is a conceptual layout of an example dialogue script that may be employed by a chat bot in one embodiment of the invention. The dialogue script may be generated using any of various languages and frameworks conventional in the art, such as, for example, Artificial Intelligence Markup Language (AIML), SCXML, or the like.

In the shown embodiment, the dialog script is implemented as a directed acyclic graph (DAG) where each of the edges has a direction (e.g., from one node to another), and there are no cycles within the graph (e.g., there are no paths in the graph that contain the same node more than once). A separate dialogue script may be generated for each known topic/intent. The topic for the dialog graph of FIG. 3 is for inquiries on contract end dates. The illustrated dialogue graph represents the various conversation paths (between the contact center and a customer) that may be associated with this topic. The text in rounded rectangles (agent nodes) identifies phrases or messages that may be output by the chat bot, and the labeled arrows (customer edges) indicate classes of customer responses. To select which outgoing edge to follow, the chat bot classifies the customer input and selects the edge that best matches the classification of the customer input. If there are no plausible matches, the chat bot may ask for clarification or alert the human agent to take over the conversation.

In some embodiments, the dialogue scripts may also be used by the intelligent agent assistant 140 to monitor the conversation between an agent and a customer to determine whether the responses from the agent are appropriate. This may occur when the human agent declines an offer from the agent assistant 140 to take over the conversation with the customer. Given the refusal, the agent assistant refrains from invoking the chat bot, but nonetheless, identifies an appropriate dialogue script and monitors the conversation in the background to determine deviations of the responses provided by the agent to responses provided in the dialogue script. If at a particular point in the dialogue the agent's response is not what is set forth in the dialogue script, the agent assistant 140 may provide a prompt or suggestion of the response that should have been provided. The agent assistant may continue to provide suggested responses to other inputs from the customer until, for example, the conversation ends. In some embodiments, the suggestions are provided regardless of whether the agent is deemed to deviate or not from the dialogue script. By giving such assistance to the agent, the agent may be able to handle the interactions more efficiently and effectively.

Figure 4:
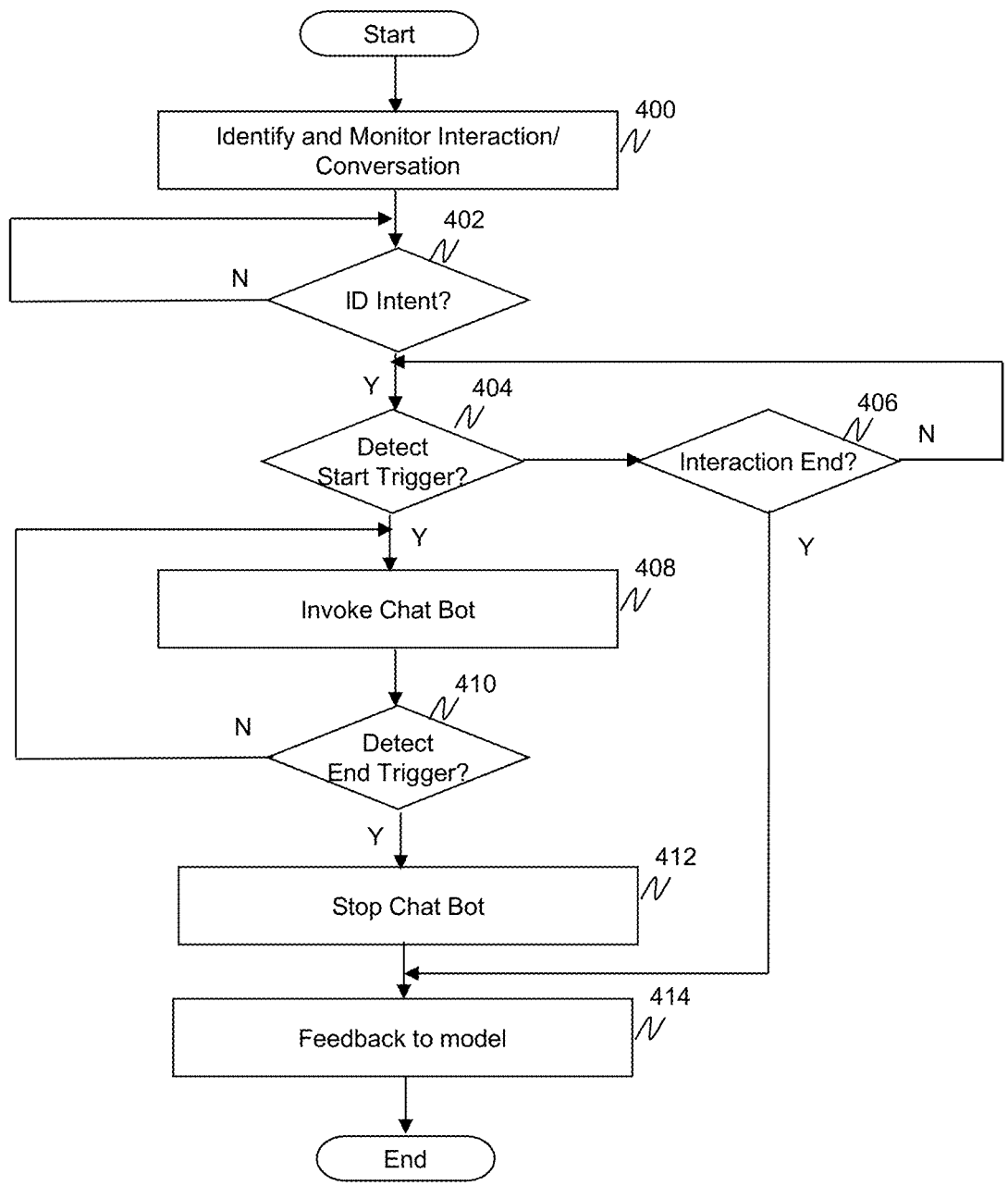
FIG. 4 is a flow diagram of a process for providing assistance to agents during an interaction in one embodiment of the invention.

FIG. 4 is a flow diagram of a process for providing assistance to agents during an interaction in one embodiment of the invention. The process starts, and in act 400, the intelligent agent assistant 140 identifies an interaction/conversation routed to a particular agent, and monitors the substance of the comments exchanged between the agent and the customer during the interaction. The routing of the interaction may be according to the methodology described above with respect to FIG. 1.

The inputs from the customer (captured via the user interface 200) and the inputs from the agent (captured via the agent interface 202) are provided to the classification engine 206 for analysis. The classification engine extracts keywords from the received inputs, and invokes the statistical model to predict a customer intent in act 402. If the probability of the predicted intent is below a threshold, the process continues to monitor the interaction for further inputs to deduce the intent with greater probability. In some embodiments, if the intent cannot be deduced within a certain number of questions and responses between the agent and the customer, the agent assistant may suggest questions to ask the customer.

In some embodiments, as keywords are extracted by the classification engine 206 from inputs provided by the user, one or more of the keywords may be visually distinguished on the agent device 130. For example, the keywords might be enlarged, underlined, or highlighted in-line of the incoming chat communication. In other examples, the keywords might be copied and pasted into a separate user-interface area of the agent device. The visually distinguished keywords might be selected from a predefined list, and/or detected based on semantic analysis. For example, keywords understood to be addresses, product names, or the like, might be selected to be visually distinguished on the agent device. Visually distinguishing keywords helps agents to quickly grasp the essence of the customer's message, allowing the interaction to be handled with higher accuracy and speed. In some embodiments, certain keywords may be automatically verified (e.g. address, company name, etc). to minimize errors.

Once the customer intent has been predicted with a certain level of confidence, a determination is made in act 404 as to whether a start trigger condition has been detected to start assisting the agent in his communication with the customer. The start trigger condition might be, for example, acceptance by the agent of an offer to engage in an automated conversation with the customer. In some embodiments, the start trigger condition may detecting that the agent is deviating from a dialog script for the predicted intent. This might occur, for example, if the agent has declined the offer by the intelligent agent assistant 140 to take over the conversation with the customer. Even if such offer is declined, the agent assistant 140 is configured, in some embodiments, to run in the background and compare the agent responses to the responses that the chat bot would have provided by following the dialog script. In some embodiments, the trigger event might simply be the receipt of a first input from the customer after the intent has been deduced. In this scenario, the chat bot is automatically invoked to take over the conversation with the customer, and does not require express command from the agent to invoke the chat bot.

If the start trigger condition is not detected and the interaction has not otherwise ended (as determined in act 406), the process continues to monitor for the start trigger condition in act 404.

Once the start trigger condition is detected, the chat bot corresponding to the deduced intent is invoked in act 408, and the chat bot proceeds to output responses based on the user inputs. The condition under which the chat bot is invoked might determine who receives the output of the chat bot responses, and under what circumstance. That is, if the agent has accepted a prompt by the agent assistant to start the automated conversation, the output by the chat bot is provided to the user in a direct conversation with the user. If the agent has not agreed to the chat bot taking over the conversation, the chat bot may provide suggestions of recommended responses to the agent, and, in some embodiments, only when the agent is deviating from the responses of the dialog script. In some scenarios, appropriate responses are suggested to the agent even if the agent is not deviating from the script.

If the chat bot is invoked to take over a conversation deep into the conversation, the chat bot identifies a portion of the dialog script that to which the conversation has progressed, and takes over the conversation from that point forward.

In act 410 a determination is made as to whether an end trigger condition has been detected. For example, the end trigger condition may be detected in response to the human agent actuating an option to end the automated conversation between the customer and the chat bot. The end of the interaction with the customer may also constitute the end trigger condition.

If the end trigger condition is detected in act 410, the execution of the chat bot terminates in act 412.

In act 414, feedback is provided to the statistical model for better identifying a customer intent in a next interaction. For example, in response to the interaction being successful, keywords used at the start of the interaction to express user intent that are not be part of the model, may now be included into the model.

Figure 5:
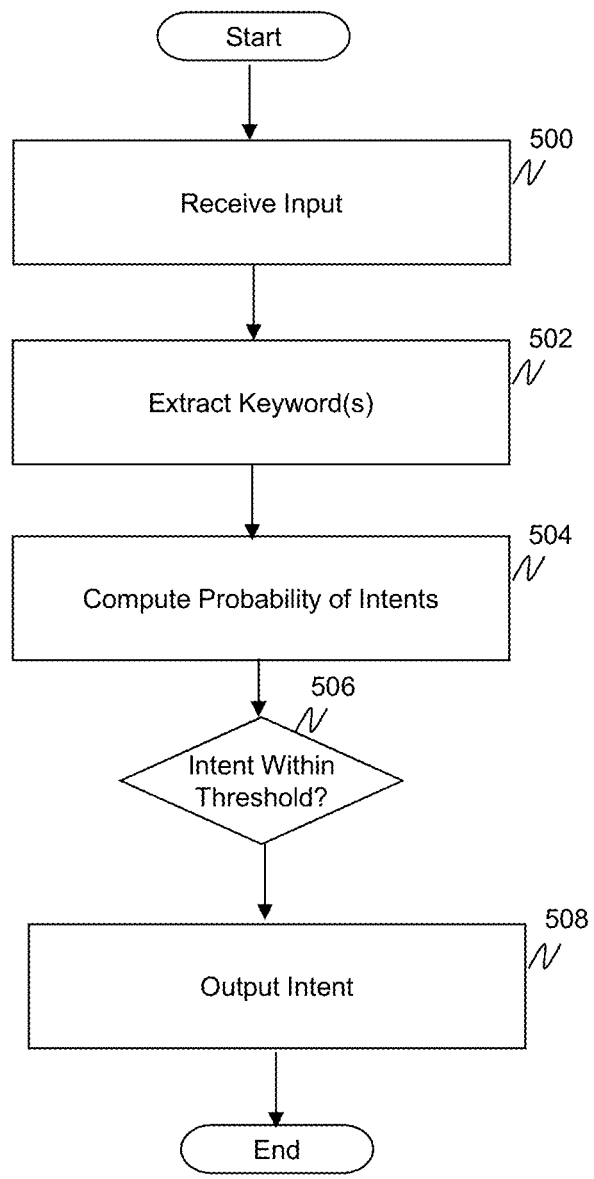
FIG. 5 is a more detailed flow diagram of a process for identifying user intent in one embodiment of the invention.

FIG. 5 is a more detailed flow diagram of a process for identifying user intent in one embodiment of the invention. In act 500, an input is received from either the customer or the agent. In act 502, the classification engine 206 proceeds to extract one or more keywords from the received input based on semantic analysis, and feeds the extracted keyword to the statistical model along with context information. The context information may include, for example, the source of the keyword (e.g. agent or customer). In some embodiments, the statistical model may give keywords uttered by the customer (or agent), higher weight in deducing intent, than keywords uttered by the agent (or customer). For example, an agent might start a conversation with the following statement: "Hi, we have promotion going on for our credit cards. Would you like to apply for one?" In another example, a customer might start the conversation by stating: "I would like to apply for a new credit card." Although both statements include the keywords "like," "apply" and "credit card," the weight of the keywords uttered by the customer may be given higher weight in deducing the intent than the keywords uttered by the agent.

In act 506, the classification engine 206 computes the probability of the various intents based on the statistical model. The computation is based on how well the combination of the extracted keywords match the keywords of the statistical model that have been assigned to a known customer intent. The better the match, the higher the probability that the assigned intent is the intent of the customer.

In act 508, a determination is made as to whether the probability of any of the intents are within a threshold confidence/probability level. The threshold confidence may be preset to be any value, such as, for example, 95%. If the answer is YES, the identified intent is output as the predicted intent in act 510. If the answer is NO, the process continues to monitor the conversation for extract further keywords to better deduce the user's intent.

For example, assume that the different types of intents known to the classification engine 206 are: 1) Apply for credit card; 2) Apply for mortgage; and 3) Order pizza. The customer starts the interaction by stating: "Hi, I would like help applying for a card." The keyword extracted from the customer input might be "help," "apply" and "card." Based on feeding the extracted keywords to the statistical model, a higher probability may be given to the credit card application intent without ruling out the mortgage application and ordering pizza intents. For example, the following example probabilities might be assigned to the known intents: 1) Apply for credit card—70%; 2) apply for mortgage—25%; 3) order pizza—5%. Assuming that the preset threshold confidence is 95%, the classification engine 206 is unable to deduce intent from the current input. Thus, the agent assistant 140 continues to monitor the conversation.

The agent might next say: "Sure, I'll be happy to assist you with your credit card application." Assuming that the next input from the customer is a "thank you" or some other positive statement, the confidence for "credit card application" intent is increased to 100%, and output as the deduced intent.

Figure 6:
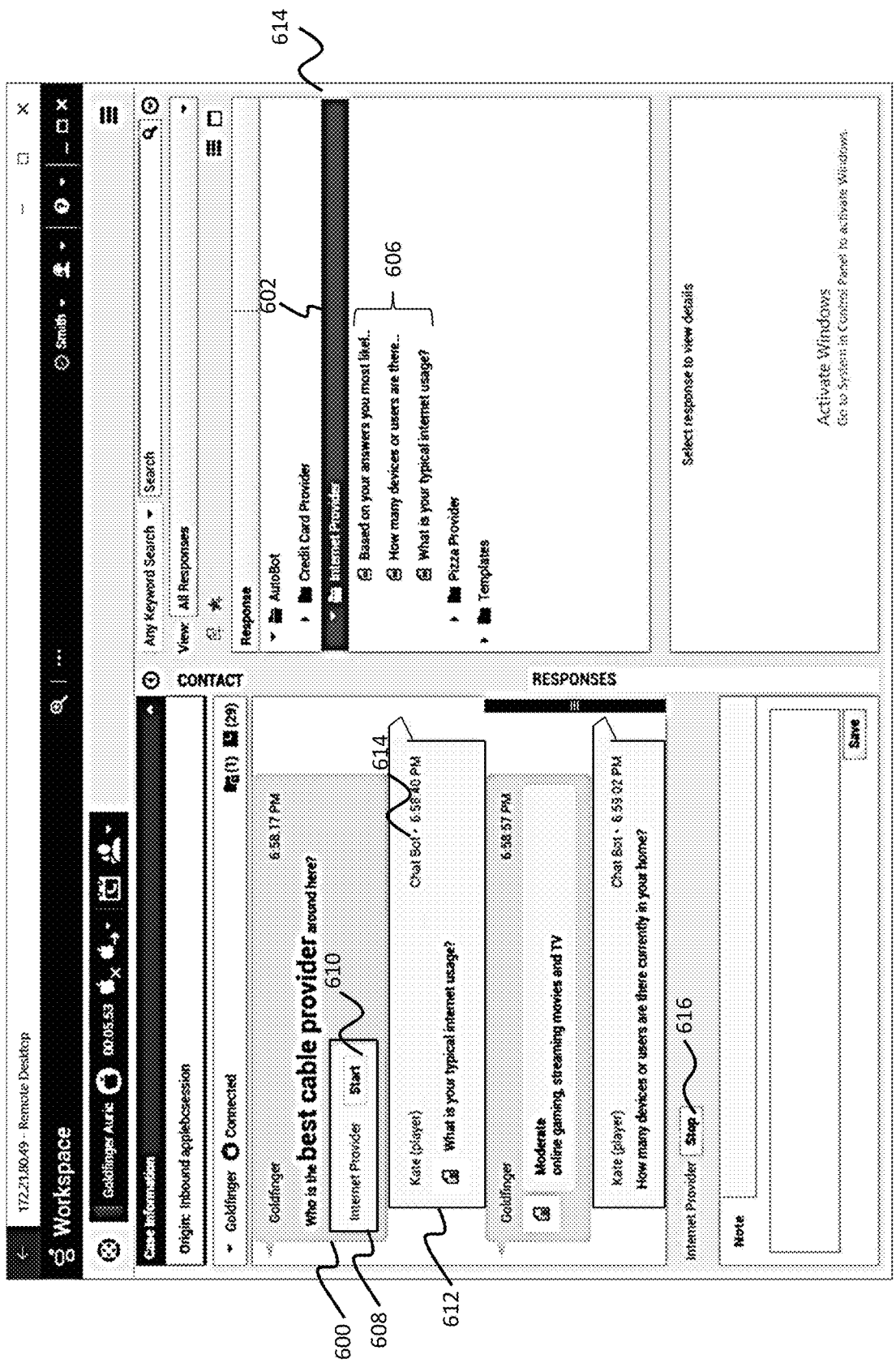
FIG. 6 is a screenshot of an example chat conversation with a customer in one embodiment of the invention.

FIG. 6 is a screenshot of an example chat conversation with a customer in one embodiment of the invention. In this example, customer Goldfinger is connected to a human agent in a chat session. The customer initiates the conversation with an initial question 600: "Who is the best cable provider around here?" The keywords "best cable provider"

are visually highlighted on the agent's device to allow the human agent to quickly focus on the important terms of the user input.

The intelligent agent assistant 140 analyzes the input 600 from the user and deduces that the intent is "internet provider." The deduced intent 602 is displayed in a separate area 604 on the agent's device. Various responses 606 that the agent may provide in response to the deduced intent are also displayed in the separate area 604. The responses may correspond, for example, to the nodes of the dialogue graph that is retrieved for the deduced intent.

The intelligent agent assistant 140 displays a prompt 608 listing the deduced intent, along with a "start" selectable option 610. The prompt acts as an offer to the human agent to engage in an automated conversation with the customer to service the customer based on the deduced intent, freeing the human agent to handle other tasks.

In response to actuation of the option 610, the intelligent agent assistant invokes the chat bot 204 that corresponds to the deduced intent. The chat bot follows the dialogue graph retrieved for the intent, and outputs an automated response 612. The chat bot may be exposed to the customer via an agent name "Kate." In some embodiments, the fact that the agent is a chat bot is also exposed to the customer via an identifier 614. In other embodiments, the identifier is hidden, and the customer is unaware that he is interacting with a chat bot.

In some embodiments, the human agent contributes to the chat communication between the chat bot and the customer, by providing his own separate comments (not shown). Such comments may be listed as coming from the human agent and not the chat bot.

The human agent monitors the automated conversation between the chat bot and the customer, and at any point, may disable the chat point from continuing the automated conversation. This may occur, for example, in response to the agent actuating a "stop" selectable option 616. The human agent may then take over the conversation with the customer in place of the chat bot.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 7A, FIG. 7B), executing computer program instructions and interacting with other system components for performing the various functionalities described herein. The computer program instructions are stored in a memory which may be implemented in a computing device using a standard memory device, such as, for example, a Random Access Memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 7A:
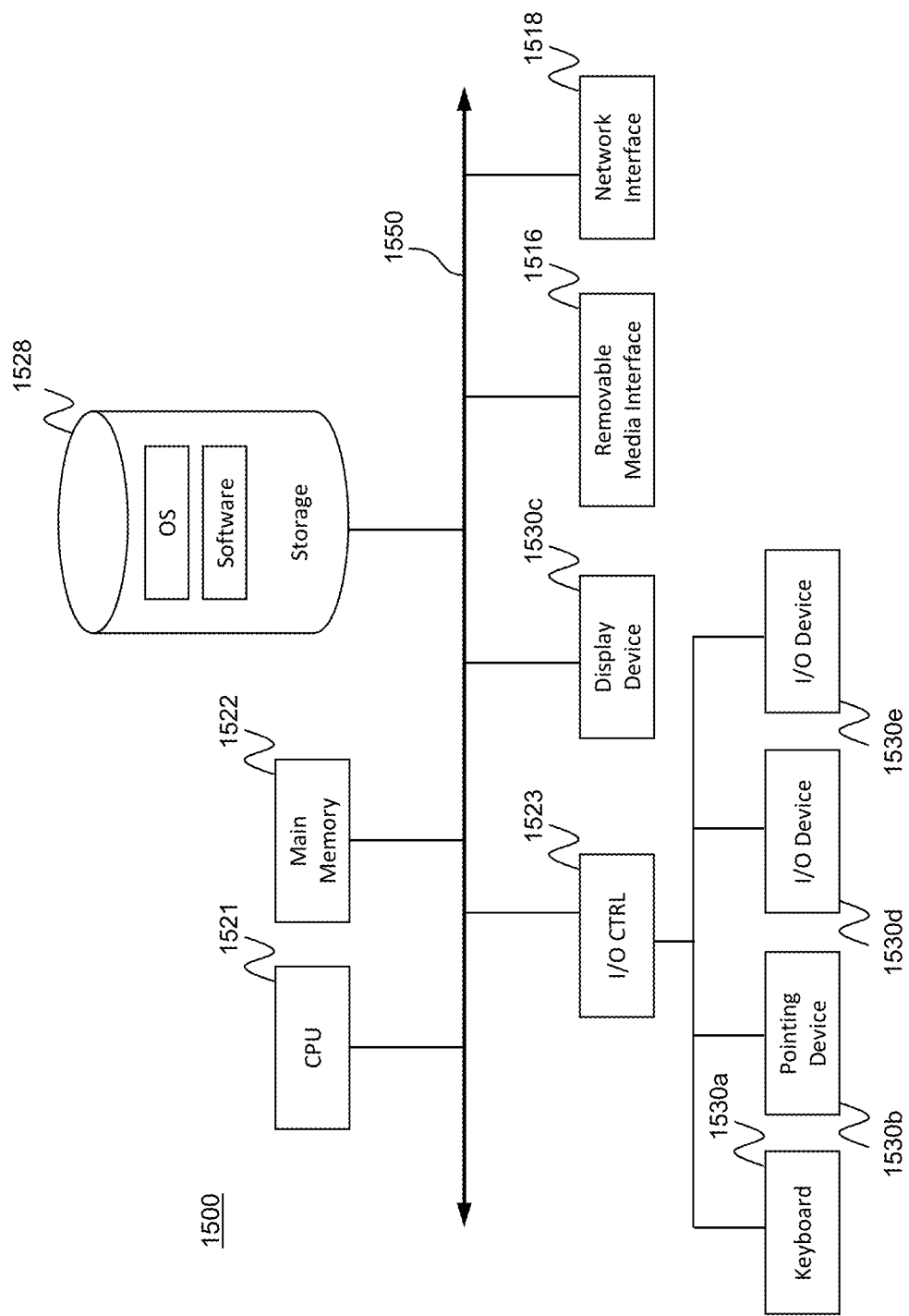
FIG. 7A is a block diagram of a computing device in one embodiment of the invention.
Figure 7B:
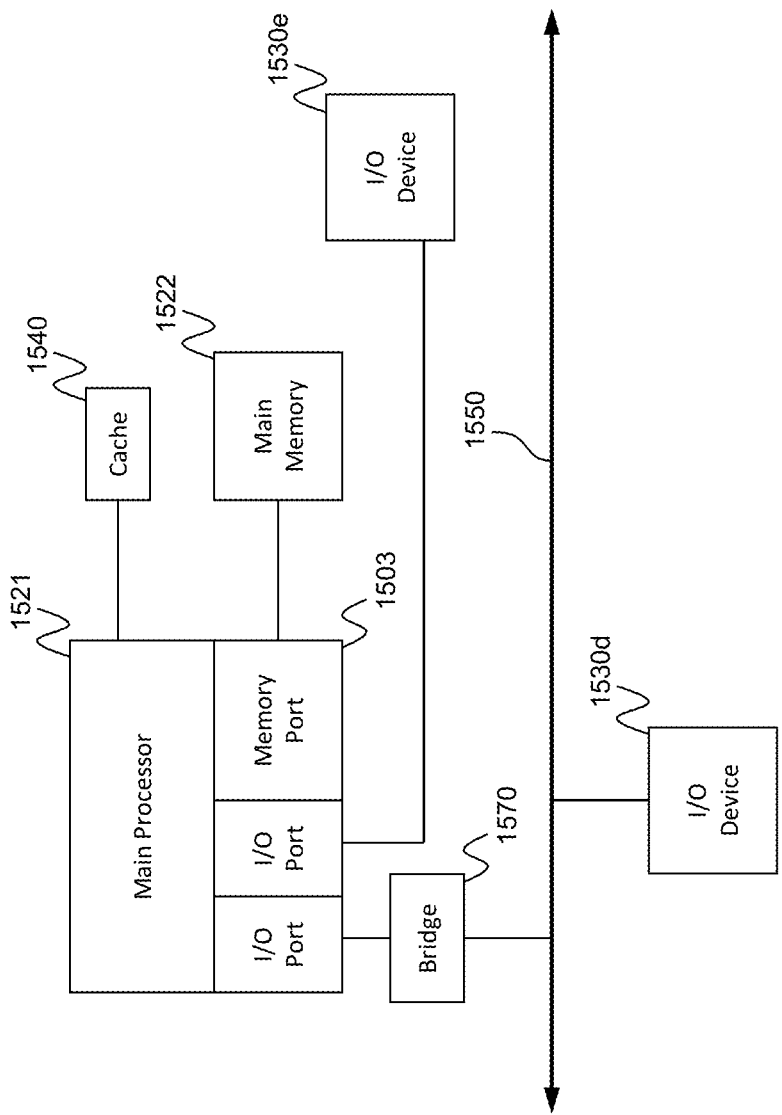
FIG. 7B is a block diagram of a computing device in one embodiment of the invention.

FIG. 7A and FIG. 7B depict block diagrams of a computing device 1500 as may be employed in exemplary embodiments of the present invention. Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory 1522 via a system bus 1550. As shown in FIG. 7B, the central processing unit 1521 may also communicate directly with the main memory 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7B depicts an embodiment of a computer 1500 in which the central processing unit 1521 communicates directly with I/O device 1530e. FIG. 7B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 7A, may control the I/O devices. The I/O controller may control one or more I/O devices such as a keyboard 1530a and a pointing device 1530b, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 7A and FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 7C:
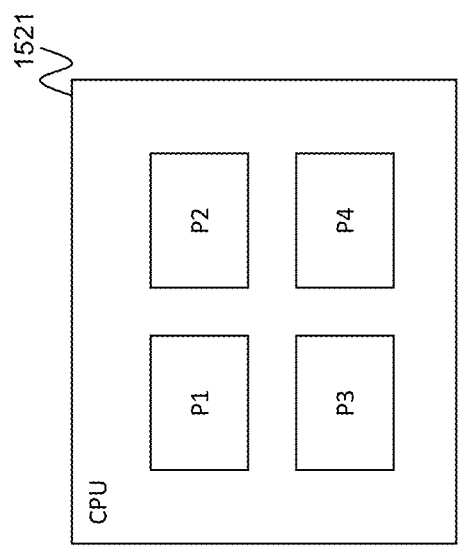
FIG. 7C is a block diagram of a computing device in one embodiment of the invention.
Figure 7D:
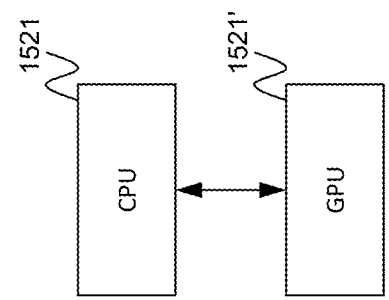
FIG. 7D is a block diagram of a computing device in one embodiment of the invention.

As shown in FIG. 7C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 7E:
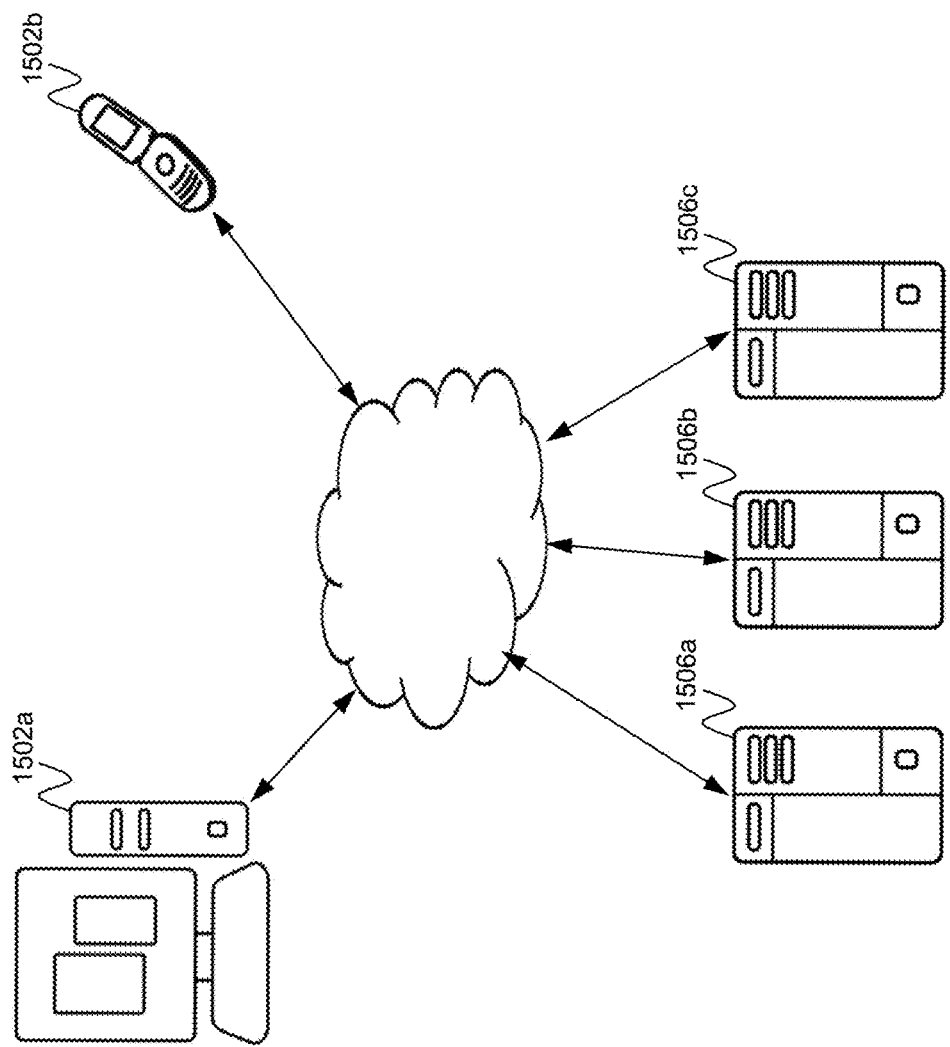
FIG. 7E is a block diagram of a network environment including several computing devices in one embodiment of the invention.

A computing device may be one of a plurality of machines connected by a network, or it may comprise a plurality of machines so connected. FIG. 7E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 7E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization are also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiments which in no way depart from the scope and spirit of the present invention. Furthermore, to those skilled in the various arts, the invention itself herein will suggest solutions to other tasks and adaptations for other applications. Thus, the present embodiments of the invention should be considered in all respects as illustrative and not restrictive.

The invention claimed is:

1. A system for handling interactions comprising:
   a processor; and
   a memory, wherein the memory stores instructions that, when executed by the processor, cause the processor to:
      monitor a real-time interaction between a contact center agent and a user, wherein the monitoring includes analyzing a first input by the user and a first response by the contact center agent to the first input;
      identify an intent of the user based on monitoring the real-time interaction;
      in response to identifying the intent, monitor for a first trigger condition;
      in response to identifying the first trigger condition, invoke an automated agent for outputting a second response to a second input provided by the user, wherein the first trigger condition is a receipt of a command by the contact center agent to invoke the automated agent to engage in an automated conversation with the user instead of the agent, wherein the second response is provided to the user by the automated agent;
      monitor for a second trigger condition;
      in response to identifying the second trigger condition, disable the automated agent from engaging in the automated conversation with the user for enabling a third response by the contact center agent instead of the automated agent; and
      resume monitoring for the first trigger condition.

2. The system of claim 1, wherein the real-time interaction is at least one of a text-based chat interaction or voice interaction.

3. The system of claim 1, wherein the instructions further cause the processor to dynamically display on a device of the contact center agent, a user-selectable icon for invoking automated agent.

4. The system of claim 1, wherein the instructions further cause the processor to:
   identify a dialog script, wherein the first trigger condition is identification of deviance by the contact center agent from dialog in the dialog script, wherein the automated agent is configured to provide the second response to the contact center agent as a suggested response.

5. The system of claim 1, wherein the instructions further cause the processor to:
   determine a level of confidence for the determined intent, wherein the first trigger is identification that the level of confidence is above a preset level.

6. The system of claim 1, wherein the instructions further cause the processor to identify key words provided by the user during the real-time interaction, and provide visual feedback for the identified key words.

7. The system of claim 1, wherein the instructions that cause the processor to identify the intent include instructions that cause the processor to:
   identify key words in the first input and in the first response;
   identify a source of each of the key words as being one of the user or the contact center agent; and
   perform intent classification based on the identified key words and the identified sources.

8. The system of claim 7, wherein the instructions that cause the processor to perform the intent classification include instructions that cause the processor to assign a probability value to an identified intent, wherein the probability value depends on a combination of the identified key words and the identified sources.

9. A method for handling interactions comprising:
monitoring, by a processor, a real-time interaction between a contact center agent and a user, wherein the monitoring includes analyzing a first input by the user and a first response by the contact center agent to the first input;
identifying, by the processor, an intent of the user based on monitoring the real-time interaction;
in response to identifying the intent, monitoring, by the processor, for a first trigger condition;
in response to identifying the first trigger condition, invoking, by the processor, an automated agent for outputting a second response to a second input provided by the user, wherein the first trigger condition is receipt of a command by the contact center agent to invoke the automated agent to engage in an automated conversation with the user instead of the agent, wherein the second response is provided to the user by the automated agent;
monitoring, by the processor, for a second trigger condition;
in response to identifying the second trigger condition, disabling, by the processor, the automated agent from engaging in the automated conversation with the user for enabling a third response by the contact center agent instead of the automated agent; and
resuming, by the processor, monitoring for the first trigger condition.

10. The method of claim 9, wherein the real-time interaction is at least one of a text-based chat interaction or voice interaction.

11. The method of claim 9 further comprising dynamically displaying on a device of the contact center agent, a user-selectable icon for invoking automated agent.

12. The method of claim 9 further comprising:
identifying, by the processor, a dialog script, wherein the first trigger condition is identification of deviance by the contact center agent from dialog in the dialog script, wherein the automated agent is configured to provide the second response to the contact center agent as a suggested response.

13. The method of claim 9 further comprising:
determining, by the processor, a level of confidence for the determined intent, wherein the first trigger is identification that the level of confidence is above a preset level.

14. The method of claim 9 further comprising:
identifying, by the processor, key words provided by the user during the real-time interaction, and providing visual feedback for the identified key words.

15. The method of claim 9, further comprising:
identifying, by the processor, key words in the first input and in the first response;
identifying, by the processor, a source of each of the key words as being one of the user or the contact center agent; and
performing, by the processor, intent classification based on the identified key words and the identified sources.

16. The method of claim 15, wherein the performing of the intent classification assigns a probability value to an identified intent, wherein the probability value depends on a combination of the identified key words and the identified sources.

* * * * *